United States Patent [19]

Heidemann

[11] Patent Number: 4,462,626
[45] Date of Patent: Jul. 31, 1984

[54] CONVEYOR BELT REPAIR TOOL

[76] Inventor: Klaus Heidemann, 133 Kenney Dr., Sewickley, Pa. 15143

[21] Appl. No.: 500,281

[22] Filed: Jun. 1, 1983

[51] Int. Cl.³ .............................................. A44B 21/00
[52] U.S. Cl. ................................ 294/114; 24/68 D; 254/250; 294/133
[58] Field of Search ............... 254/245, 250, 251, 253, 254/210; 24/31 R, 19, 37, 68 D, 69 TS, 69 ST, 132, 134 KB, 182; 294/114, 132, 133, 134, 135, 136

[56] References Cited

U.S. PATENT DOCUMENTS

| | | | |
|---|---|---|---|
| 492,972 | 3/1893 | Seeley | 294/132 X |
| 587,877 | 8/1897 | Snyder | 24/68 D |
| 898,523 | 9/1908 | Sullivan | 294/133 X |
| 935,764 | 10/1909 | Martin | 294/114 X |
| 970,495 | 9/1910 | Hammond | 294/132 |
| 1,334,865 | 3/1920 | Keel | 294/132 |
| 1,392,079 | 9/1921 | Riddle | 294/132 |
| 1,911,071 | 5/1933 | Duncan | 294/132 X |
| 1,979,555 | 11/1934 | Jakoubek | 254/253 |
| 2,620,533 | 12/1952 | Pritchett | 24/132 R |
| 3,653,708 | 4/1972 | Merola | 294/114 X |

Primary Examiner—Stuart S. Levy
Assistant Examiner—Joseph J. Hail, III
Attorney, Agent, or Firm—Kenneth R. Bowers

[57] ABSTRACT

A conveyor belt tool for repairing a broken conveyor belt which has sliding clamps to match the tool size to the belt width and thickness.

1 Claim, 5 Drawing Figures

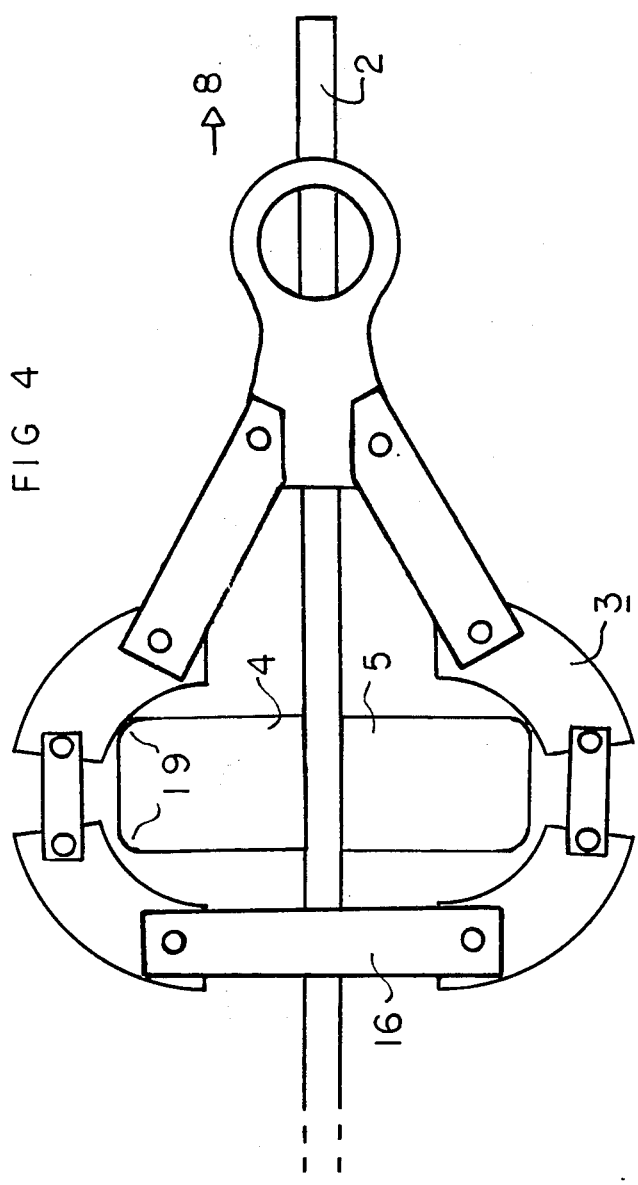

CONVEYOR BELT REPAIR TOOL

BACKGROUND

This invention relates to an improved tool for repairing damaged conveyor belts.

Conveyor belts are widely employed for the transport of heavy objects. The belt usually forms an endless loop, arranged on rollers and tracks. The load is placed on the belt and moves along with the belt.

Such conveyor belt systems are used to transport very heavy loads. For example, in coal mines and coal-burning power plants, the coal may be loaded onto a conveyor belt for transport from one location to another.

When a conveyor belt breaks, or is otherwise damaged, the usual practice is to remove a section of the belt at the site of damage and insert a new section. Connection of the first end of the new section is an easy operation because both the new section and the old belt are slack. However, connection of the second new section end to the old belt requires joining the two ends for the final connection, under the tension desired for routine belt operation, or perhaps more.

The force required to join the ends can be very large, especially if the belt is loaded with a heavy load such as is usually the case when the original break occurs. The loaded belt, perhaps supporting tons of coal, must be drawn taut, which may even require lifting the load several inches if the belt has sagged after the break.

Because of the great forces/tensions required, this operation can be dangerous. A very substantial tool is used to draw the ends of the belt together. This tool must grip the belt and exert a force thereon, without danger of slippage or accidental release which could allow the end to snap backward with great force. If this occurs pieces of coal on the belt can be flung with great force, and the belt end itself is very dangerous.

The tool currently used for this operation is designed for application to a belt of one specific width and thickness. In practice, the new sections added or the belt with which the tool is used may vary from the design width and/or thickness. This reduces the ability of the tool to grip the belt, increasing the hazard of accidental release.

Consequently it is desired to provide a tool which is adjustable over a range of belt widths and thickness so as to enable the tool to apply a maximum gripping force on conveyor belts of different sizes.

SUMMARY

A belt gripper which captures a conveyor belt between two bars which are compressed together by two clamps slidable with respect to each other along the bars so as to closely match the spacing of the clamps to the belt width. The bars may also have a gripping surface selectable among a number of such surfaces by rotation, thereby closely matching the effective bar diameters and therefore the clamping force to the belt thickness.

BRIEF DESCRIPTION OF THE DRAWINGS

FIG. 4 is a profile view of a clamping tool in a second embodiment; and

DETAILED DESCRIPTION

Figure 1:
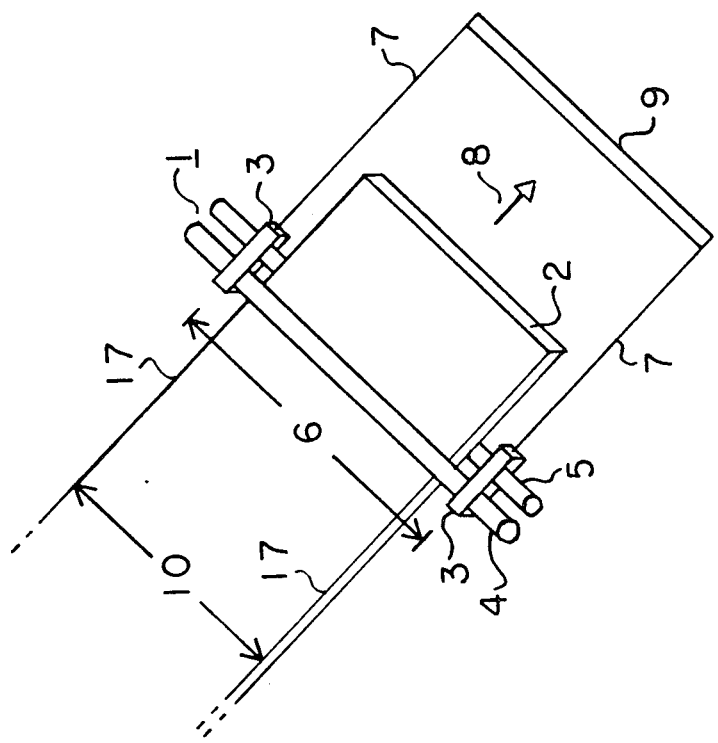
FIG. 1 is a schematic of a conveyor belt having a clamping tool installed.

Refer to FIG. 1 which shows conveyor belt gripping tool 1 disposed to pull belt 2 in direction 8 by applying a force to the belt in direction 8. Tool 1 is seized to belt 2 by compression of two bars 4 and 5 together with belt 2 compressed therebetween. The compressive force on bars 4, 5 is applied by clamps 3, which are schematically represented in FIG. 1, one on each side of belt 2. Force on the bars is applied by cable or chain 7 via spreader bar 9 by a source which is applied to spreader bar 9, this source being unspecified here and omitted from the drawings. (Block pulleys are commony used.)

Figure 2:
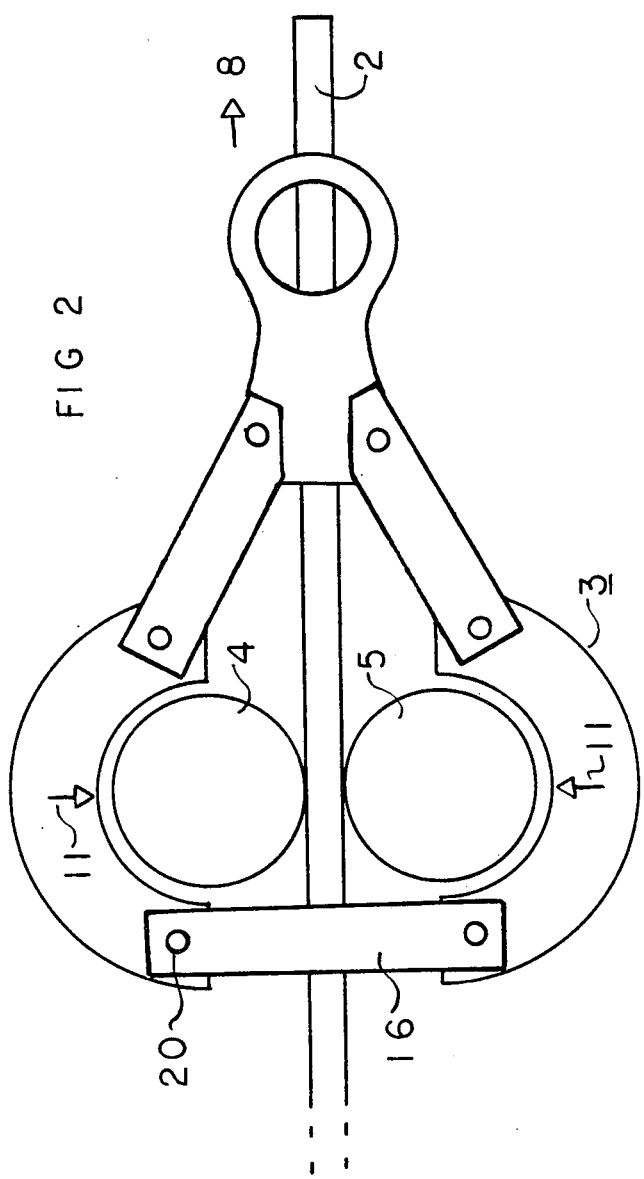
FIG. 2 is a profile view of a clamping tool in a first embodiment.
Figure 3:
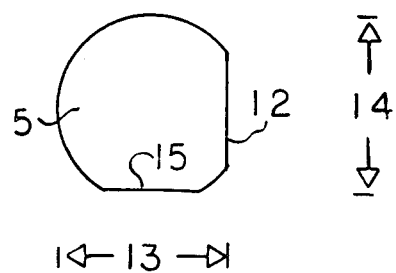
FIG. 3 is a profile of a bar as modified to allow adjustment to various belt thicknesses.

Refer to FIG. 2 which shows more detail of clamps 3. Cable 7 is omitted in FIG. 2, but applys a force in the direction of arrow 8. The mechanism of clamp 3 converts this force partially into a compressive force on belt 2 (see arrows 11) which grips the belt. In FIG. 2, the contact of bars 4, 5 with belt 2 has the geometry of a cylinder on a plane, but this may be advantageously altered by milling a flat section on one or both bars 4, 5 (See FIG. 3). Two such flat surfaces 12, 15 are shown in FIG. 3. According to the extent of such milling, bar thicknesses 13 and 14 can be realized. If bar thickness 13 is perpendicular to belt 2, the resulting overall diameter of both bars together has a specific value. If thickness 14 is so orientated, a second (and greater) overall diameter results. Selection of one of flat sections 12 or 15 or others as provided therefore enables adjustments to belt thickness so as to maximize gripping force. In FIGS. 2 and 4, gaps have been shown between tool 3 and bars 4, 5 for clarity. These gaps are closed during use.

Member 16 in FIG. 2 may have a plurality of holes 20 and means for attachment to also provide for adjustment to various belt thicknesses.

Friction between belt 2 and bars 4, 5 may be increased by corrugations or surface roughness on bars 4, 5.

The force on the belt is maximized by the application of clamp forces 11 (FIG. 2) on the bars as close to the belt edges 17 as possible. Refer to FIG. 1. Clamps 3 are slidable along bars 4, 5. Bars 4, 5 are longer in length than width 10 of any belts to which it is intended this tool be applied. As shown by FIG. 1 clamps 3 are positioned to be very near belt 2 edges 17 so as to approximately match distance 6 between clamps 3 to belt width 10. Of course, this sliding adjustment is done prior to applying force to the tool.

Figure 5:
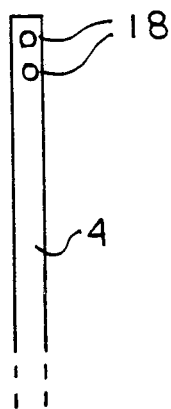
FIG. 5 is a plan view of a bar as modified to have guide pins.

FIGS. 4 and 5 illustrate a second embodiment in which bars 4, 5 have a rectangular cross-section. Two pins 18 (one shown) may be inserted outside the belt edges through holes spaced along the bar for alignment purposes. Bars 4, 5 have rounded edges 19 to enhance contact with clamp 3.

The orientation of bars 4, 5 can be chosen to present various bar thicknesses in the direction perpendicular to belt 2. In FIG. 4, the longer side of bars 4, 5 is perpendicular to belt 2, appropriate for a relatively thin belt 2. Rotation of bars, 4, 5 to bring the shorter side perpendicular to belt 2 would be appropriate for a thicker belt.

I claim:

1. A conveyor belt tool for seizing a conveyor belt which comprises:
   (a) a pair of bars of length greater than the width of said conveyor belt;
   (b) a pair of clamps, slidable along said bars, adapted to compress said bars together thereby exerting a seizing force on said conveyor belt which is disposed between said bars, said clamps exerting said force on said bars at two locations along the length of said bars, the distance between said location being adjustable to approximately equal the width of said conveyor belt due to the slidable feature of said clamps,
   (c) wherein said bars are approximately circular in cross section, at least one bar being circular except at at least two flattened circumfrential locations, said locations having different radial lengths to provide flat gripping surfaces each of which grips said belt with plane-on-plane contact, the force applied on said belt being selectable according to the belt thickness by selection of a specific flattened section of said bar and means on the clamps for rotationally mounting said at least one bar to the clamp for moving said selected surface into juxtaposition with said belt, said mounting means including at least one semicircular inner surface which conforms with the semicircular outer surface of said at least one bar.

* * * * *